US012614278B2

(12) United States Patent
Groth et al.

(10) Patent No.: US 12,614,278 B2
(45) Date of Patent: Apr. 28, 2026

(54) IMAGE SEQUENCE ANALYSIS

(71) Applicant: KONINKLIJKE PHILIPS N.V., Eindhoven (NL)

(72) Inventors: Alexandra Groth, Hamburg (DE); Tanja Lossau, Hamburg (DE); Irina Waechter-Stehle, Hamburg (DE); Frank Michael Weber, Norderstedt (DE); Jochen Peters, Norderstedt (DE); Sebastian Wild, Hamburg (DE); Arne Ewald, Hamburg (DE); Andre Goossen, Eldena (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 281 days.

(21) Appl. No.: 18/276,482

(22) PCT Filed: Jan. 24, 2022

(86) PCT No.: PCT/EP2022/051426
§ 371 (c)(1),
(2) Date: Aug. 9, 2023

(87) PCT Pub. No.: WO2022/171416
PCT Pub. Date: Aug. 18, 2022

(65) Prior Publication Data
US 2024/0127432 A1 Apr. 18, 2024

(30) Foreign Application Priority Data

Feb. 12, 2021 (EP) ..................................... 21156767

(51) Int. Cl.
G06T 7/00 (2017.01)
G06T 1/60 (2006.01)
(Continued)

(52) U.S. Cl.
CPC .............. G06T 7/0012 (2013.01); G06T 1/60 (2013.01); G06T 7/12 (2017.01); G06V 10/764 (2022.01);
(Continued)

(58) Field of Classification Search
CPC ........... G06T 7/0012; G06T 1/60; G06T 7/12; G06T 2207/10016; G06T 2207/10132;
(Continued)

(56) References Cited

U.S. PATENT DOCUMENTS

2016/0284083 A1* 9/2016 Singh ..................... G16H 40/20
2018/0130213 A1 5/2018 Yan et al.
(Continued)

OTHER PUBLICATIONS

International Search Report and Written Opinion for PCT/EP2022/051426; Mailing date: May 16, 2022, 11 pages.
(Continued)

*Primary Examiner* — Siamak Harandi

(57) ABSTRACT

A system and method for achieving more accurate results when applying an image processing task to a series of medical images of a patient, without significantly increasing processing resource. The proposed system and method is based on receiving a plurality of image sequences of a particular anatomical region, each capturing cyclical movement of an anatomical object. Each image sequence is supplied to a classifier module which employs use of one or more machine learning algorithms to derive at least one score for each image sequence indicative of predicted success or quality of a result of the image processing task if applied to the given image series. This permits an assessment to be made in advance of which of the plurality of image series is most likely to result in the best (e.g. highest quality, or greatest amount of information) results from the image processing task. This allows maximization of the quality of image processing results, without the need to
(Continued)

actually process each of the image series with the image processing task, which would consume a large amount of processing resource and consume time.

15 Claims, 2 Drawing Sheets

(51) Int. Cl.
  *G06T 7/12* (2017.01)
  *G06V 10/764* (2022.01)
(52) U.S. Cl.
  CPC .............. *G06T 2207/10016* (2013.01); *G06T 2207/10132* (2013.01); *G06T 2207/20081* (2013.01); *G06T 2207/20084* (2013.01); *G06T 2207/30004* (2013.01); *G06T 2207/30168* (2013.01)
(58) Field of Classification Search
  CPC . G06T 2207/20081; G06T 2207/20084; G06T 2207/30004; G06T 2207/30168; G06T 2207/30048; G06T 7/0002; G06V 10/764; G06V 10/82; G06V 10/993; G06V 2201/03
  See application file for complete search history.

(56) References Cited

U.S. PATENT DOCUMENTS

2019/0378312 A1    12/2019  Wang
2021/0150282 A1*   5/2021  Chadha ................. G06F 18/254

OTHER PUBLICATIONS

Frouin, F. et al., "Factor analysis of the left ventricle by echocardiography (FALVE): a new tool for detecting regional wall motion abnormalities", Eur J Echocardiogr, 2004, vol. 5, Issue 5, pp. 335-346.

Lyu, J. et al., "3D Ultrasound Spine Image Selection Using Convolution Learning-to-Rank Algorithm", IEEE Engineering in Medicine and Biology Society (EMBC), 2019, pp. 4799-4802.

Liu, D. et al., "Estimating Image Segmentation Difficulty", Lecture Notes in Computer Science, 2011, pp. 484-495.

Yan, P. et al., "Adaptively Learning Local Shape Statistics for Prostate Segmentation in Ultrasound", IEEE Transactions on Biomedical Engineering, 2011, vol. 58, No. 3, pp. 633-641.

Zhu, Y. et al., "A Dynamical Shape Prior for LV Segmentation from RT3D Echocardiography", Med Image Comput Comput Assist Interv, 2009, vol. 5761, pp. 206-213.

Jacob, G. et al., "A shape-space-based approach to tracking myocardial borders and quantifying regional left- ventricular function applied in echocardiography", IEEE Transactions on Medical Imaging, 2002, vol. 21, No. 3, pp. 226-238.

Sun, W. et al., "Segmenting and Tracking the Left Ventricle by Learning the Dynamics in Cardiac Images", Inf Process Med Imaging, 2005, vol. 19, 16 pages.

Ecabert, O. et al., "Automatic model-based segmentation of the heart in CT images", IEEE Transactions on Medical Imaging, 2008, vol. 27, No. 9, pp. 1189-1201.

* cited by examiner

IMAGE SEQUENCE ANALYSIS

CROSS-REFERENCE TO PRIOR APPLICATIONS

This application is the U.S. National Phase application under 35 U.S.C. § 371 of International Application No. PCT/EP2022/051426, filed on Jan. 24, 2022, which claims the benefit of European Patent Application No. 21156767.2, filed on Feb. 12, 2021. These applications are hereby incorporated by reference herein.

FIELD OF THE INVENTION

The present invention relates to a method in the field of medical image processing.

BACKGROUND OF THE INVENTION

In the domain of medical imaging, acquired patient image sequences are often processed with one or more automated image analysis routines to derive clinically relevant information. This may include additional anatomical information, additional graphical detail, or further clinically relevant information such as measurements. One common image processing task for example is image segmentation. Image processing tasks may be applied to images from any modality, e.g. ultrasound, MRI, CT, X-Ray, PET, or any others.

The success of an image processing procedure, e.g. the accuracy or quality of the result, depends upon the quality of the image sequence it is applied to. Often, multiple image sequences will be acquired and the processing procedure applied to each of them, to derive a set of different results. A clinician may then select the result which has the highest quality, contains the most information, or otherwise was the most successful. This avoids a scenario in which the image processing result is poor, and the patient has to be called back to repeat the scan to achieve improved results.

The process of repeating the image processing task numerous times is time consuming, and resource intensive. An improved approach to avoiding poor image processing results would be of advantage.

Reference is made to the paper: Frouin F et al: "Factor analysis of the left ventricle by echocardiography (FALVE): a new tool for detecting regional wall motion abnormalities", European Journal Of Echocardiography, Harcourt Publishers, Edinburgh, GB, vol. 5, no. 5, 1 Oct. 2004 (2004-10-01), pages 335-346. This describes a method for tracking cardiac wall motion using a factor analysis method applied to an ultrasound image sequence.

Reference is further made to the paper: L Yu Juan et al: "30 Ultrasound Spine Image Selection Using Convolution Learning-to-Rank Algorithm", 2019 41st Annual International Conference Of The IEEE Engineering In Medicine And Biology Society (EMBC), IEEE, 23 Jul. 2019 (2019-07-23), pages 4799-4802. This describes a method of selecting a best quality image of spine curvature using an artificial neural network.

SUMMARY OF THE INVENTION

The invention is defined by the claims.

According to examples in accordance with an aspect of the invention, there is provided a system for assessing candidate image series of a cyclically moving anatomical object for application of an image processing task. The system comprises a classifier module comprising at least one machine learning algorithm, the machine learning algorithm being adapted (i.e. trained) to receive as input an image series of a cyclically moving anatomical object and to generate as an output at least one score, the at least one score being representative of a predicted measure of success of a particular image processing task if it were to be applied to the image series. The system further comprises a control module adapted to: receive a plurality of image series of the cyclically moving object; supply each image series as an input to the classifier module to thereby obtain the at least one score for each of the plurality of image series; and identify a best subset of the plurality of image series for application of the image processing task based on the at least one score for each image series.

The identified best subset contains fewer image series than the received plurality of image series. It may in some cases correspond to just a single image series.

Embodiments are based on applying a selection algorithm capable of assessing in advance which of a plurality of different candidate image series is most likely to result in the best result when a particular image processing task is applied to it. This is done based on analysis or processing of the image series themselves, without the need to apply the image processing task. This therefore saves time and processing resource. The analysis of the candidate image series is done automatically using a classifier which encompasses one or more artificial intelligence algorithms. It embodies knowledge gained through a training procedure in which the one or more algorithms are trained to predict likely high quality results of the image processing task.

The best subset of the plurality of image series means the subset for which, based on the at least one score, the image processing task has a highest likelihood of success, or a highest predicted overall measure of success.

Each image series may comprise a plurality of images, each corresponding to a particular time point. Each image series may therefore correspond to a time-ordered sequence of images. This may span the whole or part of one or more movement cycles of the anatomical object.

The anatomical object is a cyclically moving anatomical object. The movement cycle may be understood as encompassing a plurality of phases. Each candidate image series may cover at least one movement cycle and preferably a plurality of cycles.

The image processing task may be an anatomy-specific image processing task, meaning an image processing task adapted for deriving information from one or more images of a particular anatomy. It may be a clinical image processing task, meaning an image processing task adapted to derive clinically relevant information from an input image series. Clinically relevant information may mean information relating to dimensions of one or more anatomical features, one or more physiological parameters, a clinical status of one or more anatomical features (e.g. normal, diseased etc.), or any others.

The method may further comprise generating a data output indicative of the identified best subset of the plurality of image series. This may be provided to a further image processing module for example. The data output may in some examples be communicated to a user interface for presentation to a user via a sensory output, e.g. for display on a display device.

The system may further include an image processing module adapted to receive as input an image series, to apply the image processing task to the input image series, and to generate an output processed image series. The control module may be adapted to supply the identified best subset of image series to the image processing module. The control module may be adapted to supply only the identified best subset of image series to the image processing module, and not supply the remainder of the image series which are not included in the identified subset. This avoids wasting processing resource applying the image processing operation to the image series which are predicted to result in a low quality image processing result.

The output of the image processing task may in some cases comprise one or more processed images. It may comprise one processed image per image of each series of candidate images. In further examples, the output of the image processing task may comprise another type of information or data derived by processing the images, for instance a list of identified anatomical features in the image series, measurements of dimensions of anatomical features within the image series, time measurements of anatomical processes within the image series. There may be one output per image of the image series, or a fewer number of outputs for the whole image series.

The control module may be adapted to store a record of the received plurality of image series in a memory (e.g. a local memory or cache), and may be adapted to remove, delete or discard from the memory each of the received image series which are not included in the identified best subset of image series, and without supplying these image series to the image processing module.

This step may in some examples be done in advance of supplying the best subset of image series to the image processing module. This maximizes memory capacity since the not needed image series are discarded at the earliest opportunity.

The one or more machine learning algorithms of the classifier module may be adapted to generate a plurality of different scores, each representing a different measure of predicted success of the image processing task. Each of the different scores may relate to a different property or quality of a given image series which is known to be correlated with quality of the image processing task output when applied to that image series (i.e. which is known to be predictive of success or quality of the image processing task output). By basing the selection of the best image series on a plurality of different scores, each mapping onto a different analyzable property of the images series, this improves robustness and reliability of the assessment, since multiple independent factors are taken into account.

The control module may be further adapted to: determine an overall score for each of the plurality of image series from the respective plurality of scores for each image series; and identify a best image series for application of the image processing task based on the overall score for each image series.

The overall score may be determined using a predefined assessment function or operation. This may comprise one or more weighted averages of the plurality of scores.

The method may comprise ranking the plurality of image series according to the at least one score or the overall score. The control module may be adapted to generate a data output indicative of the ranking of the image series for communication to a user interface device. The ranking may be displayed on a display device of the user interface. The user interface may be adapted to permit a user to select any one of the plurality of candidate image series. The displayed ranking assists the user in making their choice. The choice may be communicated to an image processing module in some examples, and the image processing module adapted to apply the image processing task to the user-selected image series.

The at least one machine learning algorithm may be a machine learning algorithm which has been trained using a training data set comprising a plurality of sample image series, each having been manually tagged with the at least one score.

In one set of embodiments, the image processing task comprises an image segmentation of one or more anatomical areas of the cyclically moving anatomical object.

In this set of embodiments, in some examples, at the least one score may include a score indicative of predicted visual (i.e. graphical, spatial, shape) correspondence between shapes or outlines generated in the segmentation when applied to the image series and the shapes or outlines present in the images of the image series. This may be referred to as a visual confidence score. It relates to the degree of correspondence between the source image series and the graphical information in the segmentation.

Additionally or alternatively, the at least one score may include a score indicative of predicted correspondence between a mesh geometry generated in the segmentation if applied to the image series and a geometry of a pre-defined anatomical object of interest. This may be referred to as a mesh plausibility score.

The known geometry may be a typical geometry of the anatomical object.

In accordance with one or more embodiments, the at least one score may include a score indicative of a predicted consistency or correspondence between:

a result of the image processing task for at least one image of the image series occurring within a first phase of a movement cycle of the anatomical object; and a result of the image processing task for a further at least one image of the image series occurring in a further phase of said movement cycle of the anatomical object.

This may be referred to as segmentation consistency score.

In at least one set of embodiments, the image series are ultrasound image series, meaning that each comprises a series of ultrasound images.

In some embodiments, the claimed system may further comprise an ultrasound imaging apparatus, and wherein the control module is adapted to receive the plurality of image series from the ultrasound imaging apparatus.

Examples in accordance with a further aspect of the invention provide a computer implemented method comprising: receiving a plurality of image series of a cyclically moving anatomical object; applying to each of the plurality of image series a classifier operation, wherein the classifier operation comprises at least one machine learning algorithm, the at least one machine learning algorithm being adapted (i.e. trained) to receive as input an image series of a cyclically moving object and to generate as an output at least one score, the at least one score being representative of a predicted measure of success of a particular image processing task if it were to be applied to the image series; and identify a best subset of the plurality of image series for application of the image processing task based on the at least one score for each image series.

In some embodiments, the method further comprises applying the image processing task to the identified best subset of the plurality of image series. The method preferably comprises applying the image processing task only to the identified best subset, and not applying image processing task to any image series, among the received plurality of image series, which are not included in the identified best subset of image series.

Examples in accordance with a further aspect of the invention provide a computer program product comprising computer program code configured, when run on a processor, to cause the processor to perform a method in accordance with any example or embodiment outlined above or described below, or in accordance with any claim of this application.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
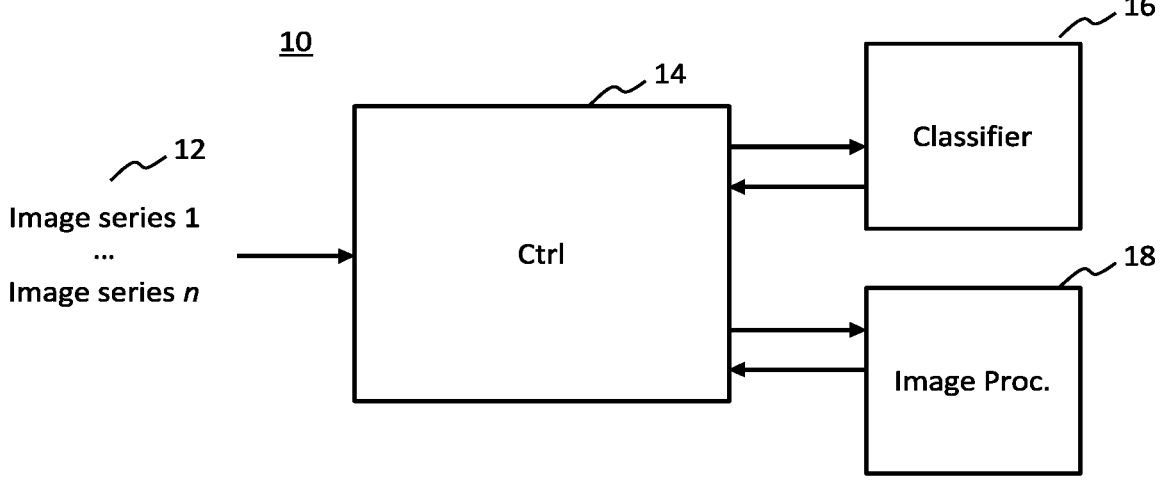
FIG. 1 schematically depicts an example system according to one or more embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a means for achieving more accurate results when applying an image processing task to a series of medical images of a patient, without significantly increasing processing resource. The proposed system and method is based on receiving a plurality of image sequences of a particular anatomical region, each capturing cyclical movement of an anatomical object. Each image sequence is supplied to a classifier module which employs use of one or more machine learning algorithms to derive at least one score for each image sequence indicative of predicted success or quality of a result of the image processing task if applied to the given image series. This permits an assessment to be made in advance of which of the plurality of image series is most likely to result in the best (e.g. highest quality, or greatest amount of information) results from the image processing task. This allows maximization of the quality of image processing results, without the need to actually process each of the image series with the image processing task, which would consume a large amount of processing resource and consume time. The classifier module can achieve the prediction much more quickly.

The image processing task may be an anatomy-specific image processing task, meaning an image processing task adapted for deriving information from one or more images of a particular anatomy. It may be a clinical image processing task, meaning an image processing task adapted to derive clinically relevant information from an input image series. Clinically relevant information may mean information relating to dimensions of one or more anatomical features, one or more physiological parameters, a status of one or more anatomical features (e.g. normal, diseased etc.), or any others.

In medical imaging, for example ultrasound imaging, often numerous image sequences are acquired per patient case. The use of unsuitable image sequences can impact derived clinical measurements or diagnosis. Therefore, given a set of image sequences, it is desirable for a clinician to perform his work on the sequence that contains the most relevant information for a given clinical task.

If the user were to perform the selection manually by looping through all sequences available, this would waste valuable time. Furthermore, the accuracy of the user's selection of the optimal image series is not guaranteed.

The selection of the best image sequence is nontrivial and depends on numerous criteria, often related to the subsequent image processing task which is to be applied to the image series. Although image quality is one factor, a purely image-quality based score would not necessarily provide an accurate prediction of success of applying the image processing task. By way of example, certain image sequences may be unsuitable for a particular clinical task since they cover the wrong anatomical field of view (FOV) (no complete coverage of the anatomy), or they do not cover the required temporal window (e.g. insufficient temporal coverage of the heart cycle to obtain views of a target heart phase).

Two image sequences can appear to be of similar quality, but it is not obvious which sequence will lead to an optimal result for the contemplated clinical image processing task. For example, it might be the case that in none of the image sequences is the target anatomical area (e.g. the whole left ventricle of the heart) clearly visible. In this case, it is unclear how to distinguish between the different image series and identify which will lead to the best image processing result. Thus, the best sequence is not necessary the sequence with the highest anatomical coverage, or the highest image quality.

Hence, a method would be of value which is capable of automatically determining which of a plurality of image sequences is best suited for a particular image processing operation. Preferably the selection method is automatic. Preferably it is operable to be performed in real time with image acquisition.

FIG. 1 schematically depicts an example system 10 in accordance with one or more embodiments of the present invention. The system is for assessing candidate image series or sequences of a cyclically moving anatomical object in relation to the application of an image processing task to the candidate image series.

The system includes a control module 14. The control module is adapted to receive a plurality of candidate image series 12 or sequences of the cyclically moving anatomical object.

The system further includes a classifier module 16 operatively coupled with the control module. The classifier module comprises or is constituted by at least one machine learning algorithm, the machine learning algorithm being adapted (i.e. trained) to receive as an input an image series of a cyclically moving object and to generate as an output at least one score, the score being representative of a predicted measure of success or accuracy of a particular image processing task if it were to be applied to the image series.

The control module 14 is further adapted to supply each of the received image series 12 as an input to the classifier module 16 to thereby obtain the at least one score for each of the plurality of image series. The control module is further adapted to identify a best subset of the plurality of image series for application of the image processing task based on the at least one score for each image series.

The best subset of the plurality of image series means for example the subset for which, based on the at least one score, the image processing task has a highest likelihood of success, or a highest predicted overall measure of success.

Embodiments of the present invention are applicable to a variety of different image processing tasks. In general these may be clinical image processing tasks, meaning image processing tasks adapted to derive or extract clinically relevant information from an input series of images. This may include, by way of example, information relating to outlines or positions of one or more anatomical features, dimensions of one or more anatomical features, one or more physiological parameters, a clinical status of one or more anatomical features (e.g. normal, diseased etc.), or any other clinically relevant information.

In accordance with some examples, the system may optionally further include an image processing module 18 operatively coupled with the control module 14 and adapted to receive as input an image series, to apply the relevant image processing task to the input image series, and to generate an output processed image series. The output processed image series may for example comprise a processed version of each of the images of the input image series (for example a segmented version of each image). Alternatively, it may comprise clinically relevant information extracted from the image series.

The at least one score may relate to a particular analyzable property or quality of a given image series which is known to be correlated with quality of the image processing task output when applied to that image series (i.e. which is known to be predictive of success or quality of the image processing task output).

The best subset of the plurality of image series may comprise a single image series or a plurality of image series.

The control module 14 may be adapted to supply to the image processing module only the identified best subset of image series, and not supply the remainder of the received image series.

The control module 14 may include a local memory or cache. The control module may be adapted to store a record of the received plurality of image series in the local memory, and to remove, delete or discard from the memory at least each of the received image series which are not included in the identified best subset of image series—without supplying the image series to the image processing module.

It is noted that although in the above example of FIG. 1, the classifier module 16, the control module 14 and the optional image processing module 18 are shown as separate components within the system 10, this is not essential. Their relevant functionalities may be distributed in different ways among one or more components. For example, the functionality of the different modules may be integrated and performed by a single element, for example by a single controller or processor, or their functionalities may be otherwise distributed between one or more elements or components. Alternatively, the functionality of each module may be performed by a separate controller or processor within the system 10.

Furthermore, although a control module 14 is shown in FIG. 1 in the form of a unitary control unit, this is for illustration only. The functions performed by the controller, both in this embodiment, and in any embodiments described throughout this disclosure, may be performed by a more distributed set of components, for instance multiple control elements or processors or by processing elements included in one or more of the other components of the apparatus.

Each image series may comprise a plurality of images, each corresponding to a particular time point. Each image series may therefore correspond to a time-ordered sequence of images. This may span the whole or part of one or more movement cycles of the anatomical object. In some examples, the classifier module may be adapted to derive at least one score based on all of the images forming the image series or only a selection of the images forming the image series. For example, it may be known that the relevant anatomical feature of interest is best depicted at a particular phase of the movement cycle. The classifier module may therefore in some examples be adapted to extract from each received image series the one or more images corresponding to a pre-determined phase of the movement cycle of the anatomical object, and to derive the at least one score based only on said extracted selection of images.

In some examples, one or more of the received image series may comprise images spanning a plurality of movement cycles of the anatomical object. In these cases, in some examples, the classifier module may be adapted to extract the images corresponding to a just a selected one of the plurality of movement cycles.

Embodiments make use of one or more machine learning algorithms to derive the at least one score of each image series.

A machine-learning algorithm is any self-training algorithm that processes input data in order to produce or predict output data. Here, the input data comprises a sequence or series of medical images and the output data comprises the at least one score indicative of a measure of predicted success of accuracy of a particular image processing task if it were to be applied to the image series.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian models are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to example image series. The training output data entries correspond to the at least one score for each image series.

The one or more machine learning algorithms of the classifier module may be adapted to generate a plurality of different scores, each representing a different measure of predicted success of the image processing task. Each of the different scores may relate to a different property or quality of a given image series which is known to be correlated with quality of the image processing task output when applied to that image series (i.e. which is known to be predictive of success or quality of the image processing task output). By basing the selection of the best image series on a plurality of different scores, each mapping onto a different analyzable property of the images series, this improves robustness and reliability of the assessment, since multiple independent factors are taken into account. In some examples, each of the scores may be determined by a different one of a plurality of machine learning algorithms comprises by the classifier module. Each may be trained specifically for determining a single particular one of the scores.

The control module may be further adapted to: determine an overall score for each of the plurality of image series from the respective plurality of scores for each image series; and identify a best image series for application of the image processing task based on the overall score for each image series.

The overall score may be determined using a predefined assessment function or operation. This may comprise one or more weighted averages of the plurality of scores. The weightings may be determined in part based on the values of the different scores, and/or based on thresholds for the different scores. A weighting may be set at zero if a score is below or above a pre-defined threshold for example.

In some examples, the image sequence(s) with the highest overall score(s) may then be used for further processing, e.g. supplied to the image processing module 18. The best subset of image series may be configured to contain a pre-defined number of image series.

The classifier module may be adapted for generating scores for a single image processing task, or for any of a plurality of different image processing tasks. For example, it may be operable in a plurality of different modes, each configured for generating at least one score for an input image series relating to a different respective image processing task. Hence, each image processing task may have its own score set.

In some embodiments, the received stack of candidate image sequences may be ranked and/or sorted according to the overall score for each of the image series. The set of ranked or sorted image sequences may be presented to a user on a user interface device, such as a display device. The user interface may permit selection by the user of the desired subset of one or more of the image series for application of the image processing task.

One image processing task for which embodiments of the present invention are particularly suited is image segmentation. In particular, the image processing task may comprise an image segmentation of one or more anatomical areas of the cyclically moving anatomical object. This may comprise identifying outlines of one or more anatomical features or areas. It may comprise generating a mesh representative of the outline or boundary of a particular anatomical object or feature.

One particular example embodiment of the invention will now be outlined in more detail. This example relates to identifying a best subset of a received plurality of image series for application of an image segmentation procedure.

In this example, the at least one score may include a score indicative of predicted correspondence between shapes or outlines generated in the segmentation and the shapes or outlines present in images of the image series. This may be referred to as a visual confidence score. The visual confidence score effectively represents the extent to which the segmentation result is supported by evidence from the image. The segmentation algorithm may employ use of a prior anatomical model, and thus a generated segmentation may in some cases derive largely from shape interpolation, with only limited image support. In this latter case, large parts of the segmentation are based only on prior heart shape information. The visual confidence score aims to assess the extent of visual or graphical correspondence between the shapes, outlines or geometry of the segmentation and the shapes, outlines or geometry of the underlying image(s) upon which it is based.

The visual confidence score may be derived for a given image series using a machine learning algorithm. The machine learning algorithm may be trained using a set of training data comprising example image series, each having been manually labelled with a visual correspondence score. The visual correspondence score can be derived based on applying the relevant image segmentation procedure to the image series in advance, with a user then manually assessing the visual correspondence between shapes and outlines of the segmentation and the image series. Applying the segmentation procedure may comprise applying the segmentation procedure to individual images of the image series to derive one segmentation for each image. The visual correspondence score for the image series may be based on the visual correspondence scores for the whole set of images forming the series, for example an average of the scores.

Once the scores are manually derived, and the training data tagged, optionally the training image series may be analyzed to identify image features that correlate with the scores (e.g. local distribution of target point distances). The machine learning algorithm may be configured to specifically analyze these features when generating the predicted score for an input image series.

Additionally or alternatively, the at least one score may include a score indicative of a predicted correspondence between a mesh geometry generated in the segmentation and a geometry of a pre-defined anatomical object of interest. This score may be referred to as a mesh plausibility score.

This score effectively represents the extent to which the resulting segmentation would be anatomically plausible. For example, if the anatomical object of interest (i.e. the anatomical object being segmented) is the whole or a portion of the heart, prior knowledge of the geometry of the whole or the relevant portion of the heart can be used to assess the extent to which a generated mesh maps geometrically onto the geometry which is expected.

The mesh plausibility score may be derived for a given image series using a machine learning algorithm. The machine learning algorithm may be trained using a set of training data comprising a plurality of example image series, each having been manually labelled with a mesh plausibility score. The mesh plausibility score can be derived by applying the relevant image segmentation procedure to each image series in advance, with a user then manually assessing the correspondence between the mesh(es) derived from the segmentation and a known or expected geometry for the relevant anatomical object based on clinician knowledge as to the expected anatomy shape.

The at least one score may additionally or alternatively include a predicted consistency or correspondence between: a result of the image segmentation for at least one image of the image series occurring within a first phase of a movement cycle of the anatomical object; and a result of the image segmentation for a further at least one image of the image series occurring in a further phase of the movement cycle of the anatomical object. The first phase can be a phase at any point in the movement cycle (i.e. it does not need to be a chronological starting phase of the cycle).

This score may be referred to as segmentation consistency. By way of example, the segmentation procedure may be for segmenting the heart. The segmentation consistency may relate to a consistency between the segmentation results derived in the end diastolic (ED) and end systolic (ES) phases respectively. This may result in one score per image sequence.

Each of the above scores may be represented by a numerical value within a pre-defined range of possible values. One or more of the scores may instead take a binary value, for example true/false, or pass/fail. For instance, a binary value might be used for the segmentation consistency score, and optionally numerical values for the other scores.

In some examples, the classifier module may be adapted to generate at least two of the above three scores. In some examples, all three of the above scores may be generated by the classifier module.

For example, in operation, a plurality of input image series 12 are received. Each is supplied as an input to the classifier module 16 which generates the two or more scores for each image series.

After the scoring of each image series with two or more different scores individually, a pre-determined function is used to obtain an overall score for each of the plurality of input image series. By way of one non-limiting example, the calculation of the overall score may be based on a weighted average of the scores. However, other examples of predetermined functions for combining the plurality of scores into a single overall score may also be considered. This may for example be a linear function, or a non-linear function. It may in some examples make use of an algorithm with one or more steps for filtering, processing or otherwise handling the scores to derive the overall score. The predetermined function for combining plurality of scores into a single overall score may be recorded in a local datastore, and the control unit may retrieve the predetermined function during operation.

In some examples, in addition to calculation of an overall score, a threshold range may be applied to at least one of the scores and wherein a candidate image series is excluded from the subset of best image series if the at least one of the score falls outside of the threshold range. An overall score may then be calculated for each of the image series whose scores do fall within the threshold range.

Based on the overall scores, a subset of one or more of the image series is selected for application of the image processing task.

By way of illustration, one function for generating the overall score might be as follows. Image sequences with [segmentation consistency score]=[False] and [Mesh plausibility] for any image (frame)>[X] are excluded, where X is a pre-defined value. The overall score is then calculated as a weighted average of the visual confidence score of the processed frames and of the mesh plausibility score of the processed frames. If the anatomical object of interest is the heart, in some examples just the ED and ES frames of each series may be processed. Optionally, each of the image sequences which have not been excluded are ranked according to their respective overall score.

One possible application of the invention is for use with ultrasound image sequences representative of the heart. These may be captured for example with a transesophageal echocardiography (TEE) or a transthoracic echocardiography (TTE) probe. The image processing task may be segmentation of the whole or a portion (e.g. left ventricle) of the heart. The segmentation can be used in practice for a variety of clinical functions including quantification of physical dimensions of sections of the heart, quantification of hemodynamic parameters, intervention planning, and visualization. The segmentation may be a model-based segmentation.

In some examples, the classifier module may be adapted to determine the at least one score based on the whole set of images forming each image series (e.g. image-by-image), or based on only a selected one or more of the images forming each image sequence (for example only those images corresponding to a particular phase of the heart cycle, e.g. ED and ES image fames). In some examples, for every sequence that comprises more than one heart cycle, a best heart cycle from that image sequence may be identified (e.g. with one or more machine learning algorithms) and compared to the best heart cycles of the other sequences from the received plurality of image sequences.

By way of one example, the selection of a single TEE image series from a plurality of image series may comprise first extracting the ED and ES phase images from each of the plurality of image series. The three scores outlined above may then be evaluated for the ED phase image of each of the TEE images sequences. For each ED image, the segmentation consistency score referred to above can be evaluated by comparing the ED image to the corresponding ES image extracted from the same image series. If the segmentation consistency score is below a defined minimum threshold, that may be taken to indicate a failure, in which case the corresponding image series is discarded. The best image series is selected based on the scores for the ED images of each image series.

In a further embodiment, each received series of images may be representative not of a time-ordered sequence of images, but to a set of 2D slices though a 3D anatomical region. The same general principles referred to above for selecting the best subset of the image series can also be applied in this case.

According to one or more embodiments, the system 10 may further comprise an ultrasound imaging apparatus, and wherein the control module 14 is adapted to receive the plurality of image series from the ultrasound imaging apparatus. The ultrasound imaging apparatus may comprise an ultrasound transducer unit, such as an ultrasound probe, for acquiring ultrasound data. The imaging apparatus may further include components for deriving ultrasound images from the acquired ultrasound data.

Figure 2:
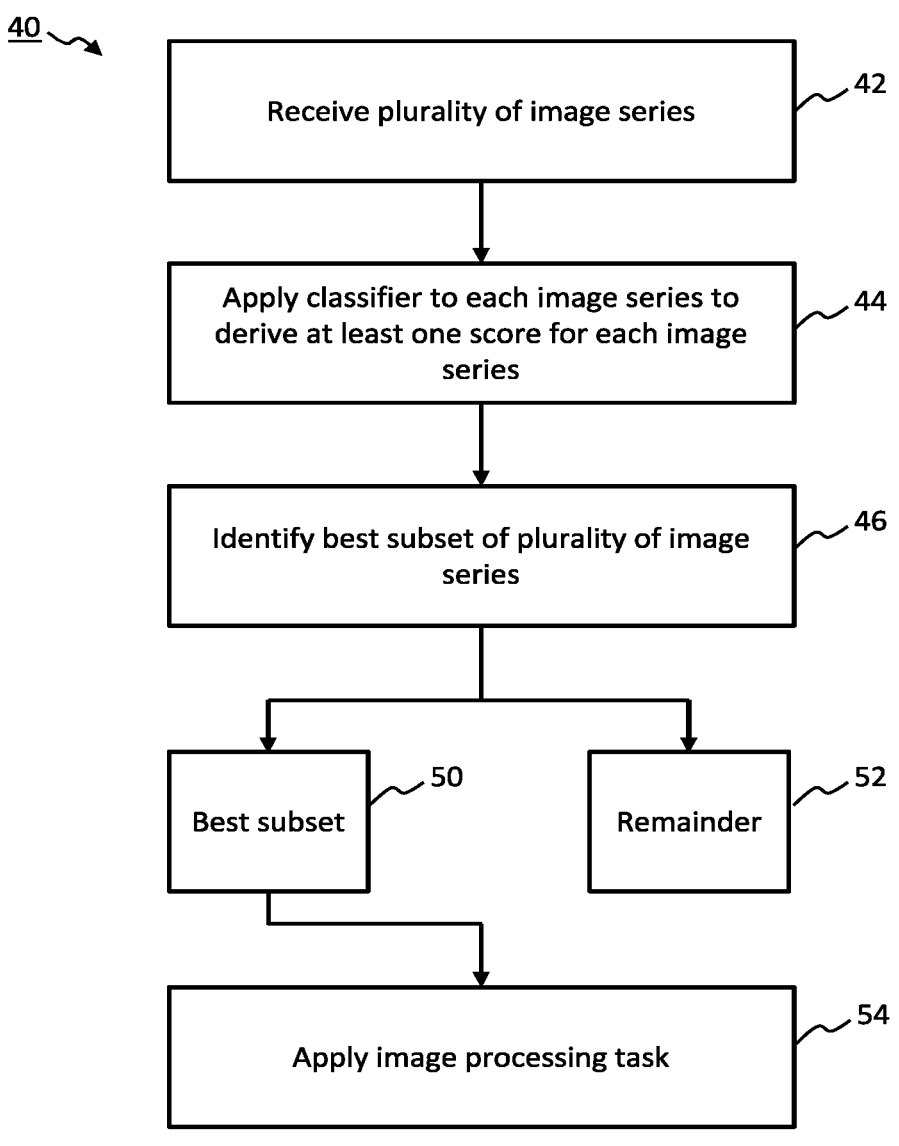
FIG. 2 outlines steps of an example method according to one or more embodiments.

Examples in accordance with a further aspect of the invention provide a computer implemented method. Steps of an example method 40 according to one or more embodiments are outlined in FIG. 2.

The method comprises receiving 42 a plurality of image series of a cyclically moving anatomical object. The method further comprises applying 44 to each of the plurality of image series a classifier operation, wherein the classifier operation comprises at least one machine learning algorithm. The at least one machine learning algorithm is adapted to receive as an input an image series of a cyclically moving object and to generate as an output at least one score, the at least one score being representative of a predicted measure of success of a particular image processing task if it were to be applied to the image series. The method further comprises identifying 46 a best subset 50 of the plurality of image series for application of the image processing task based on the at least one score for each image series. Optionally, the remainder 52 of the received plurality of image series may be discarded. Optionally, the method may further comprise applying 54 the image processing task to the identified best subset 54 of the plurality of image series. Preferably, the image processing task is applied only to the identified best subset 54 of the plurality of image series.

Examples in accordance with a further aspect of the invention provide a computer program product comprising computer program code configured, when run on a processor, to cause the processor to perform a method in accordance with any example or embodiment outlined above or described below, or in accordance with any claim of this application.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A system for assessing candidate image series of a cyclically moving anatomical object for application of an image processing task, the system comprising:
   a classifier module comprising at least one machine learning algorithm, the machine learning algorithm to receive as input an image series of a cyclically moving object and to generate as an output at least one score, the score being representative of a predicted measure of success of a particular image processing task if it were to be applied to the image series; and
   a controller to:
      receive a plurality of candidate image series of the cyclically moving anatomical object, supply each image series as an input to the classifier module to thereby obtain the at least one score for each of the plurality of image series, and
      identify a best subset of the plurality of image series for application of the image processing task based on the at least one score for each image series.

2. A system as claimed in claim 1, wherein the system further includes an image processor to receive as input an image series, and in response to instructions, to apply the image processing task to the input image series, and to generate an output processed image series.

3. A system as claimed in claim 2, wherein the control module is to supply, in response to an instruction to supply, the identified best subset of image series to the image processor module.

4. A system as claimed in claim 3, wherein the controller is stores, in response to an instruction to store, a record of the received plurality of image series in a memory, and deletes from the memory, in response to an instruction to delete from the memory, at least each of the received image series which are not included in the identified best subset of image series without supplying the image series to the image processor.

5. A system as claimed in claim 1, wherein the one or more machine learning algorithms of the classifier module are to generate a plurality of different scores, each representing a different measure of predicted success of the image processing task.

6. A system as claimed in claim 5, where in response to instructions to do so, the controller:
   determines an overall score for each of the plurality of image series from the respective plurality of scores for each image series; and
   identifies a best subset of the image series for application of the image processing task based on the overall score for each image series.

7. A system as claimed in claim 1, wherein identifying a best subset of the plurality of image series, comprises ranking the plurality of image series according to the at least one score or the overall score.

8. A system as claimed in claim 1, wherein the at least one machine learning algorithm is a machine learning algorithm which has been trained using a training data set comprising a plurality of sample image series, each having been manually tagged with the at least one score.

9. A system as claimed in claim 1, wherein the image processing task comprises an image segmentation of one or more anatomical areas of the cyclically moving anatomical object.

10. A system as claimed in claim 9, wherein at least one score includes:
   a score indicative of predicted correspondence between shapes or outlines generated in the segmentation when applied to the image series and the shapes or outlines present in the image series; and/or
   a score indicative of predicted correspondence between a mesh geometry generated in the segmentation when applied to the image series and a geometry of a predefined anatomical object of interest.

11. A system as claimed in claim 1, wherein the received plurality of image series comprises a plurality of ultrasound image series.

12. A system as claimed in claim 1, further comprising an ultrasound imaging apparatus, and wherein the controller receives the plurality of image series from the ultrasound imaging apparatus.

13. A computer implemented method comprising:

receiving a plurality of image series of a cyclically moving anatomical object;

applying to each of the plurality of image series a classifier operation, wherein the classifier operation comprises at least one machine learning algorithm, the at least one machine learning algorithm to receive as input an image series of a cyclically moving object and to generate as an output at least one score, the at least one score being representative of a predicted measure of success of a particular image processing task if it were to be applied to the image series, identifying a best subset of the plurality of image series for application of the image processing task based on the at least one score for each image series.

14. The method as claimed in claim 13, further comprising applying the image processing task only to the identified best subset of the plurality of image series.

15. A non-transitory computer readable medium comprising computer program code that in response to execution on a processor causes the processor to perform the method in accordance with claim 13.

* * * * *